United States Patent [19]

Henriquez

[11] Patent Number: 5,076,630

[45] Date of Patent: * Dec. 31, 1991

[54] VEHICULAR STORAGE DEVICE

[75] Inventor: Kenneth R. Henriquez, Tampa, Fla.

[73] Assignee: Slide-Out, Inc., Tampa, Fla.

[*] Notice: The portion of the term of this patent subsequent to May 14, 2008 has been disclaimed.

[21] Appl. No.: 699,199

[22] Filed: May 13, 1991

Related U.S. Application Data

[63] Continuation-in-part of Ser. No. 534,493, Jun. 7, 1990, Pat. No. 5,015,025.

[51] Int. Cl.[5] .............................................. B60R 11/06
[52] U.S. Cl. .................................. 296/37.6; 296/37.1; 211/126; 211/131; 224/42.42
[58] Field of Search ............................. 296/37.6, 37.1; 211/131, 126, 169, 88; 224/42.42; 16/89

[56] References Cited

U.S. PATENT DOCUMENTS

| | | | |
|---|---|---|---|
| 2,817,444 | 12/1957 | Brandell | 211/169 X |
| 3,957,159 | 5/1976 | Radek | 211/131 X |
| 4,705,315 | 11/1987 | Cherry | 296/37.6 X |
| 4,889,377 | 12/1989 | Hughes | 296/37.6 X |
| 4,898,284 | 2/1990 | Arens | 296/37.6 X |
| 5,015,025 | 5/1991 | Henriquez | 296/37.6 |

FOREIGN PATENT DOCUMENTS

85/00733  2/1985  World Int. Prop. O. ......... 296/37.6

Primary Examiner—Russell D. Stormer
Assistant Examiner—Joseph D. Pape
Attorney, Agent, or Firm—Arthur W. Fisher, III

[57] ABSTRACT

A vehicular storage device for use in a van or the like comprising a storage panel selectively movable between a first and second position rotatably mounted to the interior of the van by a storage panel support and a storage panel securing mechanism movable between a first and second position such that when the storage panel securing mechanism is in the first position the storage panel securing mechanism secures the storage panel from movement when in the first position and when the storage panel securing mechanism is moved from the first to the second position the storage panel is moved from the first to the second position.

21 Claims, 6 Drawing Sheets

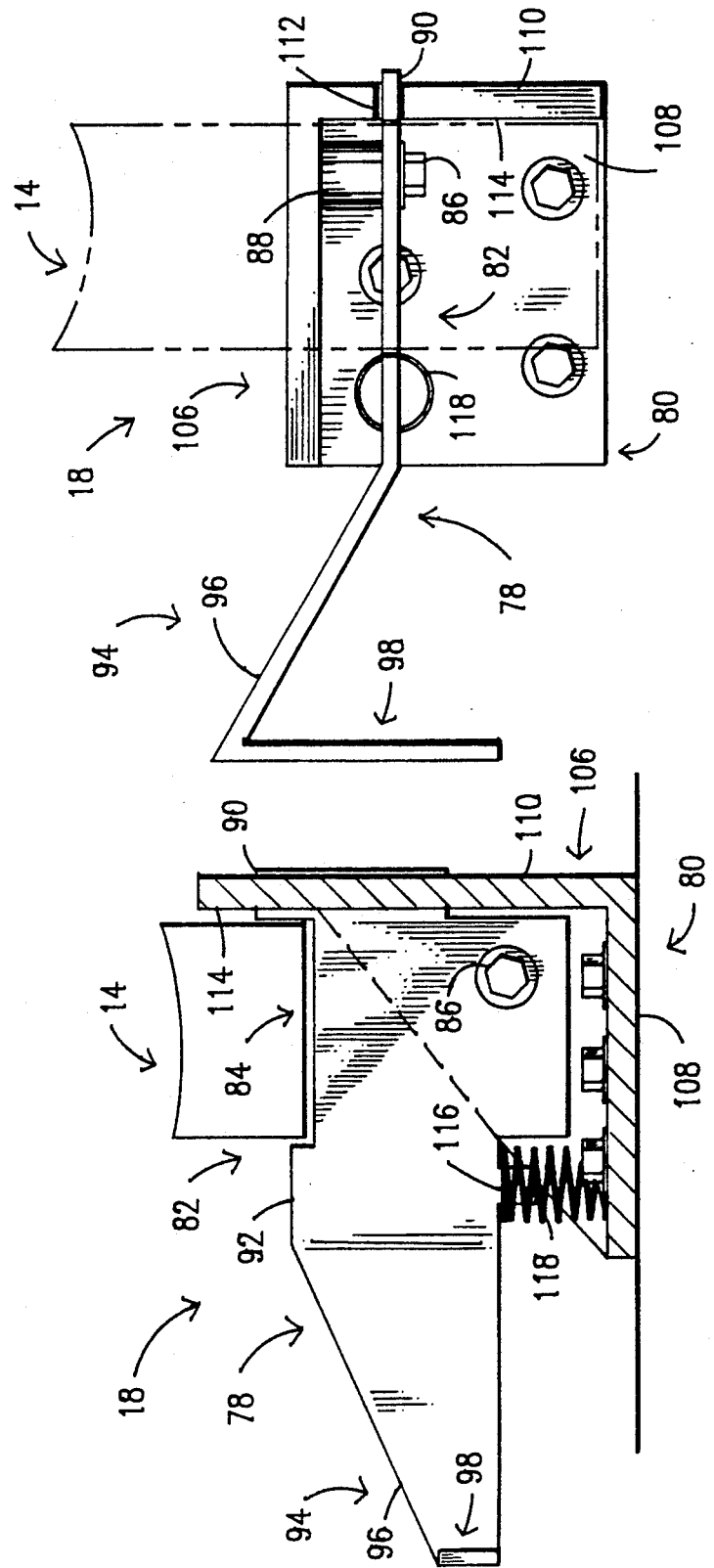

VEHICULAR STORAGE DEVICE

CROSS-REFERENCE

This application is a continuation-in-part application of pending application Ser. No. 534,493, filed June 7, 1990, now U.S. Pat. No. 5,015,025.

BACKGROUND OF THE INVENTION

1. Field of the Invention

A vehicular storage device for use with a van or the like comprising a storage panel rotatable mounted to the interior of the van and a storage panel securing mechanism to selectively secure the storage panel from movement.

2. Description of the Prior Art

Vans or panel trucks are often used for commercial purposes such as the transport and storage of tools, equipment and other similar material. In addition, pickup trucks may be fitted with cap covers for similar purposes.

Unfortunately, vans and panel trucks include a single large cargo space. As a result, material placed in the cargo space can shift or slide during operation of such vehicles. Moreover, access to material in the cargo space is limited often requiring an individual to crawl into the cargo space to retrieve the desired material.

U.S. Pat. No. 4,705,315 discloses a slidable storage container mounted on an extension track which permits an operator to extract the storage container through the open cargo doors so that the storage container is easily accessible.

U.S. Pat. No. 3,360,136 shows a display panel frame including an upper and lower horizontal track having a series of vertically positioned, rectangular frames slidably mounted thereon.

U.S. Pat. No. 3,468,509 relates to a track mounting bracket having mounting tracks formed thereon to slidably support doors depending therefrom.

U.S. Pat. No. 4,305,695 discloses a slide or rollout tray including an array of casters between the deck and the trayto provide a slideout feature.

U.S. Pat. No. 3,957,159 shows a storage panel, a storage panel support and a storage panel securing mechanism for installation in a service van.

Additional examples of the prior art are shown in U.S. Pat. No. 690,698; U.S. Pat. No. 1,720,260; U.S. Pat. No. 1,918,149; U.S. Pat. No. 2,817,444; U.S. Pat. No. 3,883,004; U.S. Pat. No. 3,908,831; U.S. Pat. No. 3,945,510; U.S. Pat. No. 4,228,906; U.S. Pat. No. 4,322,006; U.S. Pat. No. 4,377,241; U.S. Pat. No. 4,889,377; U.S. Pat. No. 4,898,284 and WIPO 8500733.

SUMMARY OF THE INVENTION

The present invention relates to a vehicular storage device comprising a storage panel rotatably mounted to the interior of a van or similar vehicle by a storage panel support and a storage panel securing mechanism.

The storage panel comprises a pair of substantially vertical storage panel members held in spaced parallel relationship relative to each other by a storage panel frame. The storage panel frame comprises an upper and lower substantially horizontal support member held in spaced relationship by at least two substantially vertical support members.

The storage panel support comprises a hollow substantially vertical column disposed between the pair of substantially vertical storage panel members adjacent one end of the storage panel support to receive an upper and lower coupling member in the upper and lower portions thereof. The upper and lower coupling members are mounted to the roof and floor of the van by an upper and lower mounting bracket respectively.

The storage panel securing mechanism comprises a locking member movable between a first or locked position and a second or unlocked position including a locking recess formed thereon to selectively receive the storage panel therein when in the first position to secure the storage panel in place.

In use, the storage panel is normally secured or locked in a first position by the storage panel securing mechanism when the storage panel securing mechanism is in the first or locked position. In this configuration, a person has access to one of the storage panel members from the rear of the van. Movement of the storage panel securing mechanism from the first to the second position releases the storage panel from the locking recess permitting rotation of the storage panel on the storage panel support providing access to the other storage panel member. To again secure or lock the storage panel in the first position, the storage panel is rotated to engage the storage panel securing mechanism in the first or locked position.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 4 is a side view of the storage panel securing mechanism.

FIG. 5 is a top view of the storage panel securing mechanism.

Similar reference characters refer to similar parts throughout the several views of the drawings.

DETAILED DESCRIPTION OF THE PREFERRED EMBODIMENT

Figure 1:
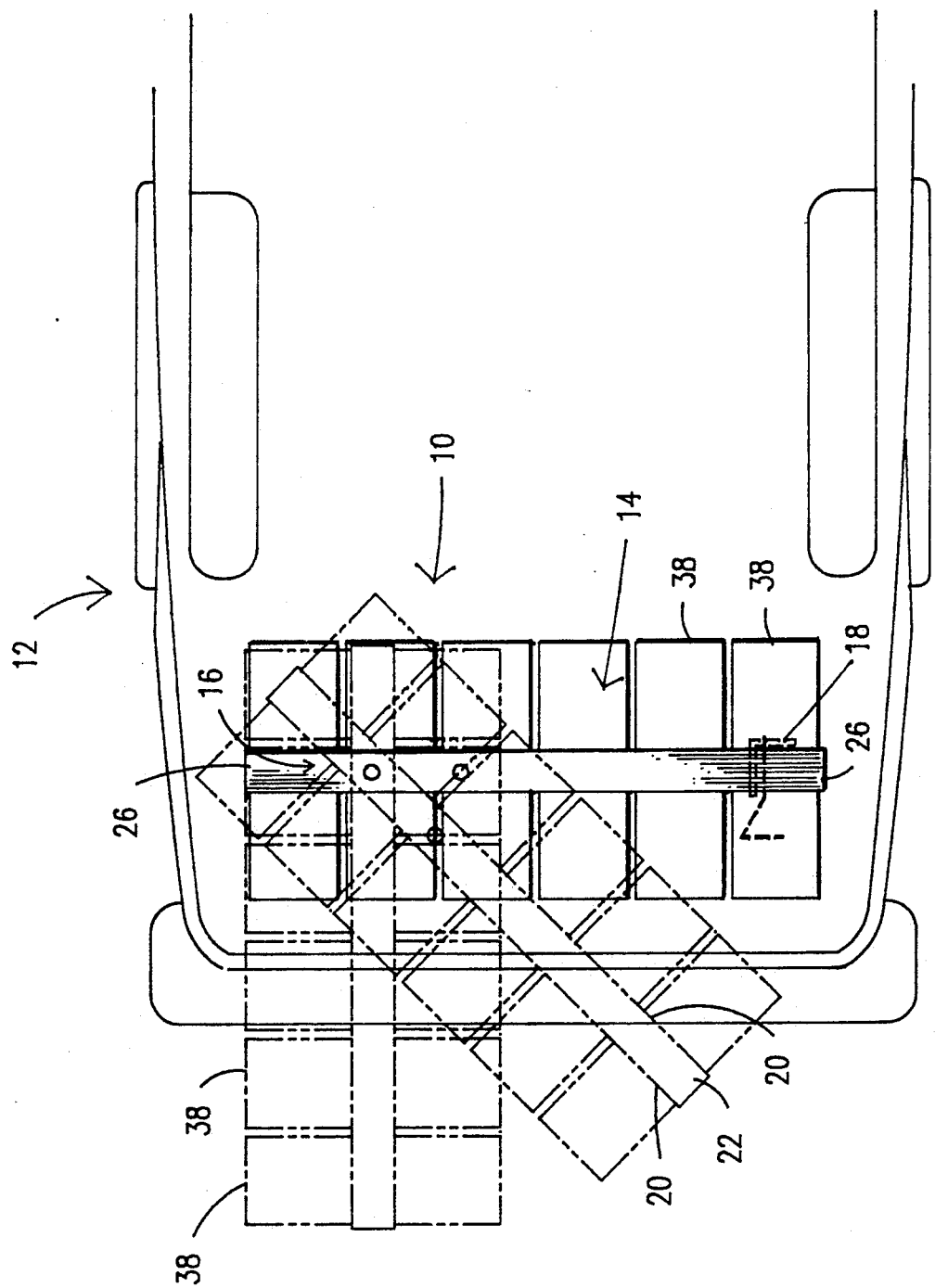
FIG. 1 is a top view of the vehicular storage device in a van.
Figure 2:
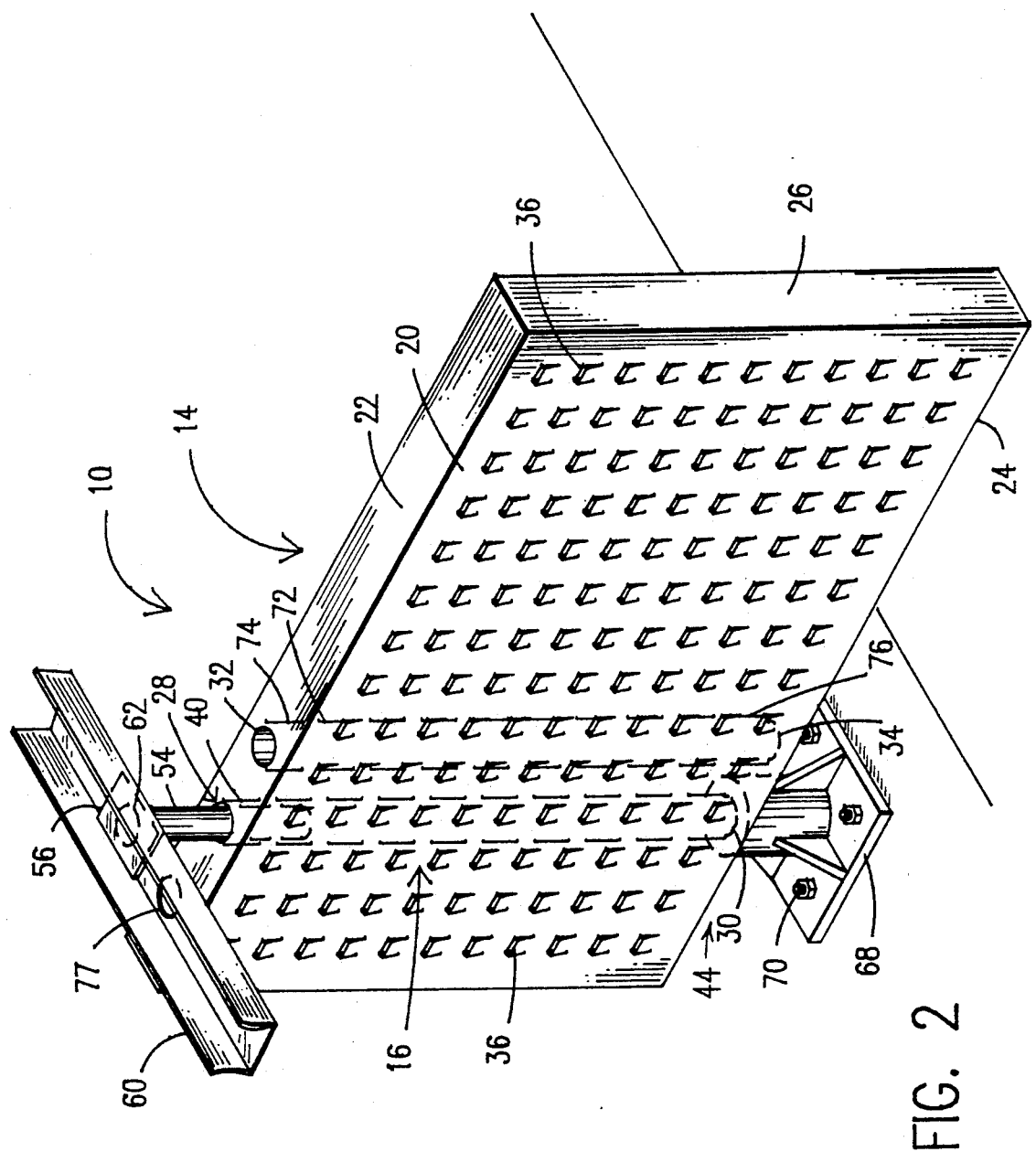
FIG. 2 is a perspective view of the vehicular storage device.

As best shown in FIGS. 1 and 2, the present invention relates to a vehicular storage device generally indicated as 10 for use with a van or similar vehicle generally indicated as 12. As described more fully hereinafter, the vehicular storage device 10 comprises a substantially vertical storage panel generally indicated as 14 rotatably mounted to the van 12 by a storage panel support generally indicated as 16. The vehicular storage device 10 further includes a storage panel securing mechanism 18.

As best shown in FIGS. 1 and 2, the substantially vertical storage panel 14 comprises a pair of substantially vertical storage panel members each indicated 20 held in spaced parallel relationship relative to each other by a storage panel frame. The storage panel frame comprises an upper and lower substantially horizontal frame member indicated as 22 and 24 respectively held in spaced relationship relative to each other by at least two substantially vertical frame members each indicated as 26. A first upper and lower concentrically aligned aperture indicated as 28 and 30 respectively are formed through the upper and lower substantially horizontal frame members 22 and 24 respectively adjacent one end thereof to operatively receive the storage panel support 16 as described more fully hereinafter. A second upper and lower concentrically aligned aperture indicated as 32 and 34 respectively are formed through the upper and lower substantially horizontal frame members 22 and 24 respectively in spaced relationship relative to the first upper and lower concentrically aligned aperture 28 and 30 to alternately receive the storage panel support 16 as described more fully hereinafter. A plurality of bin support brackets each indicated as 36 are formed on each of the substantially vertical storage panel members 20 to receive and support a corresponding plurality of open bins or containers each indicated as 38.

Figure 3:
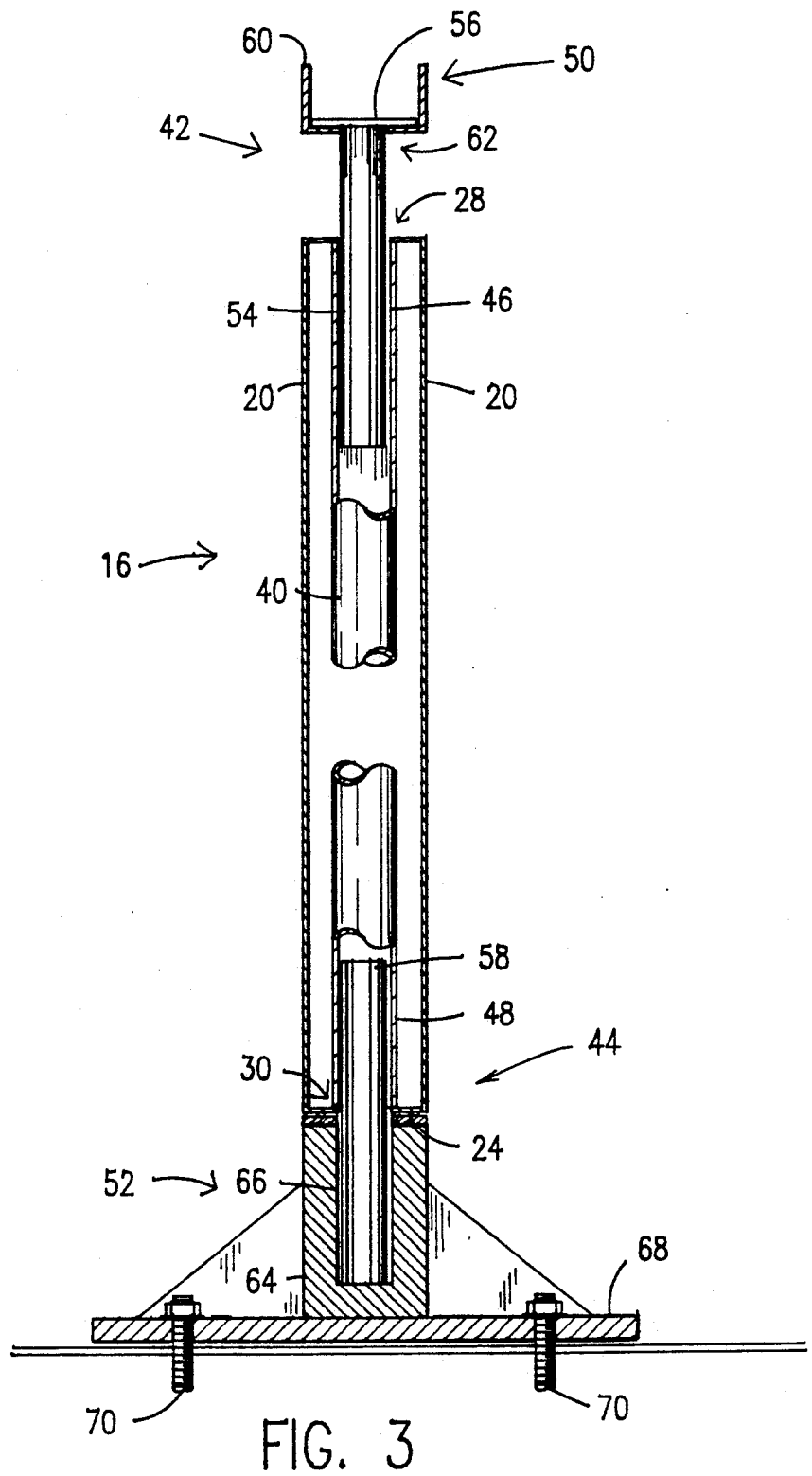
FIG. 3 is a cross-sectional view of the vehicular storage panel support.

As best shown in FIGS. 2 and 3, the storage panel support 16 comprises a first hollow substantially vertical column 40 concentrically aligned with the first upper and lower concentrically aligned apertures 28 and 30 disposed between the pair of substantially vertical storage panel members 20 to receive an upper and lower coupling member generally indicated as 42 and 44 respectively in the upper and lower portions 46 and 48 thereof. The upper and lower coupling members 42 and 44 are mounted to the roof and floor of the van 12 by an upper and lower mounting bracket generally indicated as 50 and 52 respectively.

The upper coupling member 42 comprises an upper substantially cylindrical member 54 extending into the upper portion 46 of the first hollow substantially vertical column 40 and is mounted to the upper mounting bracket 50 by an upper plate 56. The lower coupling member 44 comprises a lower substantially cylindrical member 58 extending into the lower portion 48 of the first hollow substantially vertical column 40 mounted to the floor of the van 12 by the lower mounting bracket 52.

The upper mounting bracket 50 comprises a channel 60 having a first aperture 62 formed therethrough to receive the upper substantially cylindrical member 54 affixed to the roof of the van 12.

The lower mounting bracket 52 comprises a substantially vertical housing 64 having a recess 66 formed therein to receive the lower substantially cylindrical member 58 therein affixed to the floor of the van 12 by a lower mounting bracket plate 68 and fastener 70.

As best shown in FIG. 2, a second hollow substantially vertical column 72 concentrically aligned with the second upper and lower concentrically aligned apertures 32 and 34 disposed between the pair of substantially vertical storage panel members 20 to alternately receive the upper and lower coupling member 42 and 44 respectively in the upper and lower portions 74 and 76 respectively. In addition, a second aperture 77 is formed through the channel 60 in spaced relationship relative to the first aperture 62 to alternately receive the upper substantially cylindrical member 54.

As best shown in FIGS. 4 and 5, the storage panel securing mechanism 18 comprises a locking member generally indicated as 78 movable between a first or locking position and a second or unlocked position mounted on the floor of the van 12 by a securing mechanism bracket generally indicated as 80. The locking member 78 comprises an inner locking element 82 including a locking recess 84 to selectively receive the substantially vertical storage panel 14 when each is in the first position to secure the substantially vertical storage panel 14 in place pivotally mounted on the securing mechanism bracket 80 by a connector pin 86 and spacer 88. The locking recess 84 is cooperatively formed by a first recess element or pusher member 90 disposed above and in spaced relationship to a second recess element or forward stop member 92.

The locking member 78 further includes intermediate camming element 94 having an inclined camming surface 96 formed thereon and an outer actuator element 98. The intermediate camming element 94 is disposed in angular relationship relative to the inner locking element 82; while, the outer actuator element 98 is disposed in angular relationship relative to the intermediate camming element 94.

The securing mechanism bracket 80 comprises a substantially vertical L-shaped wall generally indicated as 106 affixed to the floor of the van 12 by a base plate 108. The rear portion 110 of the substantially vertical L-shaped wall 106 includes a slot 112 to operatively receive a portion of the inner locking element 82 and limit the rotational movement thereof as well as forming a back stop 114.

A retainer member 116 extends downwardly from the inner locking element 82 to receive a portion of a bias 118 to normally position the locking mechanism in the first or locking position.

In use, the substantially vertical storage panel 14 is normally secured or locked in a first position by the storage panel securing mechanism 18 when the storage panel securing mechanism 18 is in the first or locked position. In this configuration, a person has access to one of the substantially vertical storage panel members 20 from the rear of the van 12. Movement of the storage panel securing mechanism 18 from the first to the second position releases the substantially vertical storage panel 14 from the locking recess 84 with the first recess element 90 forcing rotation of the substantially vertical storage panel 14 on the substantially vertical storage panel support 16 providing access to the other substantially storage panel member 20. To again secure or lock the substantially vertical storage panel 14 in the first position, the substantially vertical storage panel 14 is rotated to engage the inclined camming surface 96 of the storage panel securing mechanism 18 to the first or locked position.

Alternately the upper coupling member 42 may be moved laterally to register with the second aperture 77 and second upper concentrically aligned aperture 32 while the lower coupling member 44 and lower mounting bracket 52 may be moved laterally to register with the second lower concentric aligned aperture 34 to provide greater separation between the wall of the van 12 and the substantially vertical storage panel 14 when in the second position.

Figure 6:
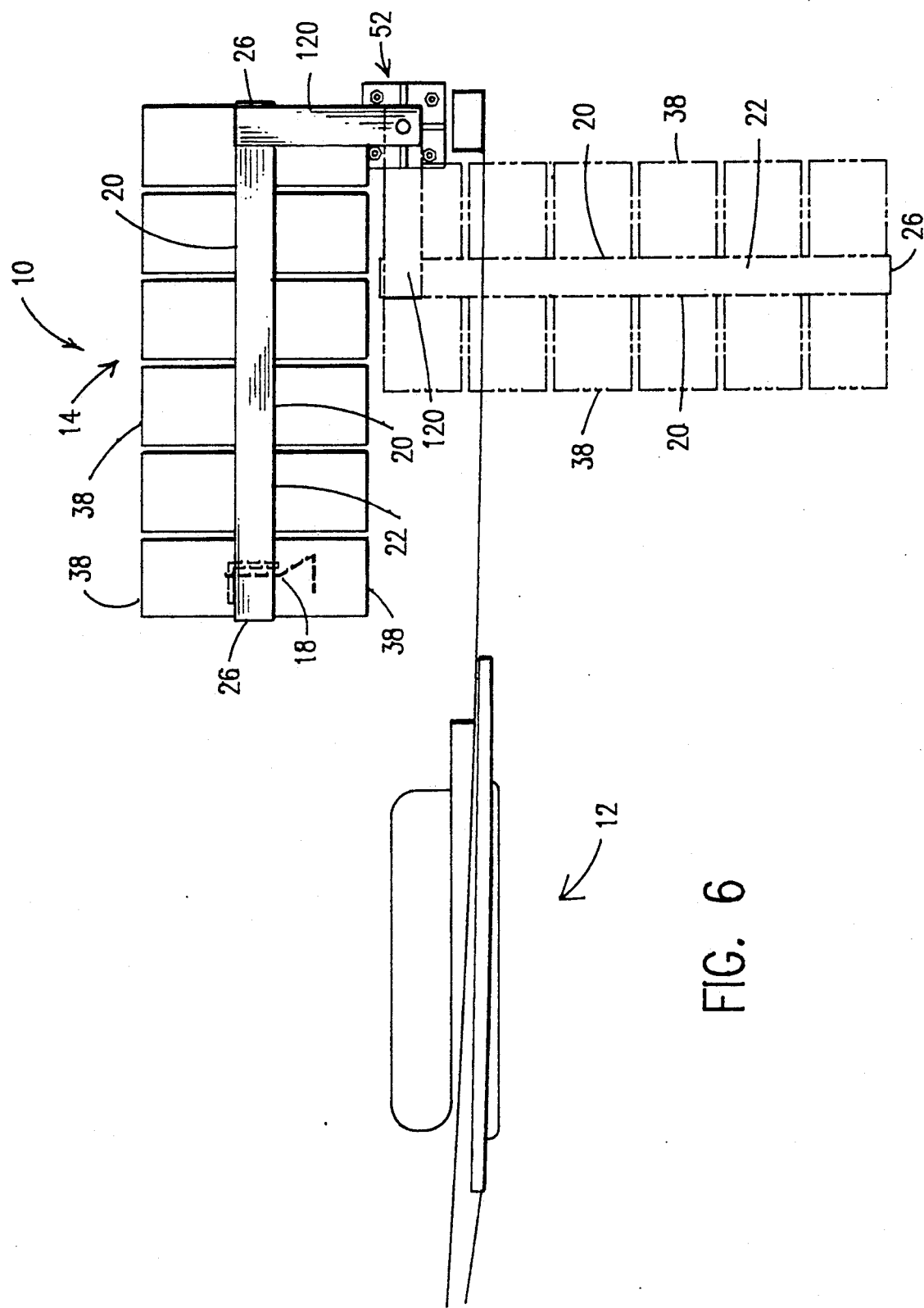
FIG. 6 is a top view of an alternate emabodiment of the vehicular storage device in a van.
Figure 7:
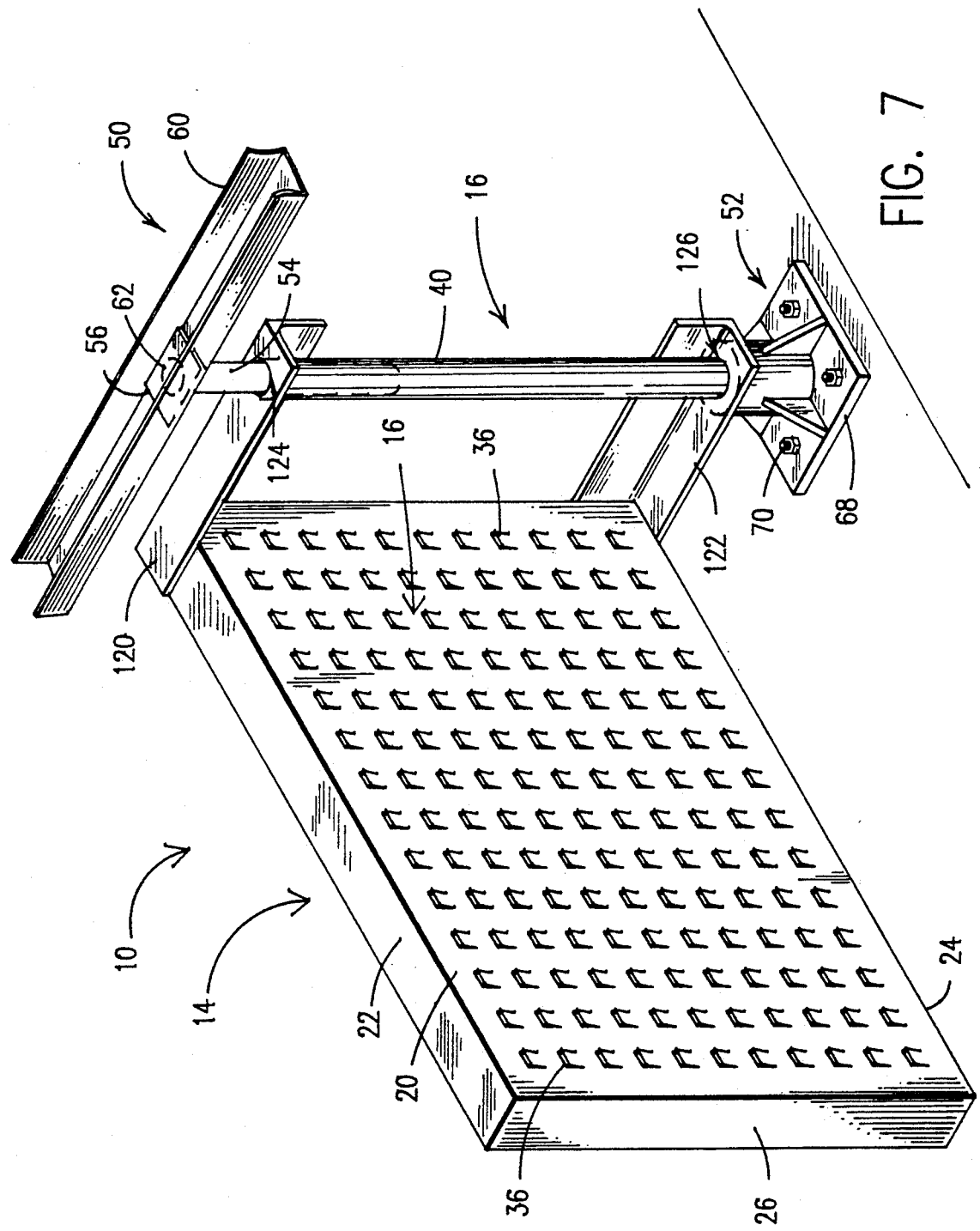
FIG. 7 is a perspective view of the alternate embodiment of the vehicular storage device.

FIGS. 6 and 7 show an alternate embodiment of the vehicular storage device 10 comprising the substantially vertical storage panel 14 including the pair of substantially vertical storage panel members 20 held in spaced parallel relationship relative to each other by the storage panel frame. The storage panel frame comprises the upper and lower substantially horizontal frame member indicated as 22 and 24 respectively held in spaced relationship relative to each other by at least two substantially vertical frame members each indicated as 26. An offset mounting means couples the substantially vertical storage panel 14 to the storage panel support 16. Specifically, the offset mounting means comprises an upper and lower V-shaped offset mounting member indicated as 120 and 122 respectively affixed to the upper and lower substantially horizontal frame members 22 and 24 respectively and an upper and lower concentrically aligned mounting aperture indicated as 124 and 126 respectively formed through the upper and lower V-shaped offset mounting members 120 and 122 respectively to receive the first hollow substantially vertical column 40 therethrough to operatively couple the substantially vertical storage panel 14 to the The plurality of bin support brackets 36 are formed on each of the substantially vertical storage panel members 20 to receive and support a corresponding plurality of open bins or containers 38.

As shown in FIG. 7, the storage panel support 16 is similar to the structure shown in FIGS. 2 and 3. Specifically as shown in FIG. 3, the storage panel support 16 comprises the first hollow substantially vertical column 40 aligned with the upper and lower concentrically aligned apertures 124 and 126 to receive the upper and lower coupling members 42 and 44 respectively in the upper and lower portions 46 and 48 thereof. The upper and lower coupling members 42 and 44 are mounted to the roof and floor of the van 12 by an upper and lower mounting bracket generally indicated as 50 and 52 respectively.

The upper coupling member 42 comprises an upper substantially cylindrical member 54 extending into the upper portion 46 of the first hollow substantially vertical column 40 and is mounted to the upper mounting bracket 50 by an upper plate 56. The lower coupling member 44 comprises a lower substantially cylindrical member 58 extending into the lower portion 48 of the first hollow substantially vertical column 40 mounted to the floor of the van 12 by the lower mounting bracket 52.

The upper mounting bracket 50 comprises a channel 60 having a first aperture 62 formed therethrough to receive the upper substantially cylindrical member 54 affixed to the roof of the van 12.

The lower mounting bracket 52 comprises a substantially vertical housing 64 having a recess 66 formed therein to receive the lower substantially cylindrical member 58 therein affixed to the floor of the van 12 by a lower mounting bracket plate 68 and fastener 70.

In use the operation of the alternate embodiment of the vehicular storage device 10 shown in FIGS. 6 and 7 is similar to that of the embodiment of the vehicle storage device 10 shown in FIGS. 1 through 5. However as best shown in FIG. 6, the offset mounting means permits rotation of the substantially vertical storage panel 14 such that the substantially vertical storage panels 20 are substantially disposed outside the van 12 when in the second position.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A vehicular storage device for use in a van or the like comprising a storage panel including at least one substantially vertical storage panel member selectively movable between a first and second position rotatably mounted to the interior of the van by a storage panel support, a storage panel frame comprising an upper and lower substantially horizontal frame member held in spaced relationship relative to each other by at least two substantially vertical frame members and a first upper and lower concentrically aligned aperture formed through said upper and lower substantially horizontal frame members respectively adjacent one end thereof to operatively receive said storage panel support and a storage panel securing mechanism movable between a first and second position such that when said storage panel securing mechanism is in said first position said storage panel securing mechanism secures said storage panel from movement when in said first position and when said storage panel securing mechanism is moved from said first to the second position said storage panel is released from said first position allowing pivoting of said storage panel to said second position.

2. The vehicular storage device of claim 1 wherein said storage panel support comprises a first hollow substantially vertical column concentrically aligned with said first upper and lower concentrically aligned apertures and to receive an upper and lower coupling member respectively in the upper and lower portions thereof mounted to the roof and floor of the van respectively.

3. The vehicular storage device of claim 2 wherein said upper coupling member comprises an upper substantially cylindrical member extending into said upper portion of said first hollow substantially vertical column and said lower coupling member comprises a lower substantially cylindrical member extending into said lower portion of said first hollow substantially vertical column.

4. The vehicular storage device of claim 2 further including a second hollow substantially vertical column concentrically aligned with a second upper and lower concentrically aligned aperture disposed between said pair of substantially vertical storage panel members to alternately receive said upper and lower coupling members respectively in the upper and lower portions thereof.

5. The vehicular storage device of claim 1 wherein said storage panel securing mechanism comprises a locking member movable between a first or locking position and a second or unlocked position mounted on the floor of the van, said locking member comprises an inner locking element including a locking recess to selectively receive said substanstially vertical storage panel when said locking member and said substantially vertical storage panel are each in said first position.

6. The vehicular storage device of claim 5 wherein said locking member further includes an intermediate camming element having an inclined camming surface formed thereon and an outer actuator element.

7. The vehicular storage device of claim 5 wherein said storage panel securing mechanism further includes a securing mechanism bracket comprising a substantially vertical wall affixed to the floor of the van to support said locking member, a portion of said substantially vertical wall includes a slot to operatively receive a portion of said inner locking element and limit the rotational movement thereof.

8. The vehicular storage device of claim 7 wherein a portion of said substantially vertical wall forms a back stop to limit movement of said substantially vertical storage panel when in said first position.

9. The vehicular storage device of claim 5 further including a retainer member extending downwardly from said inner locking element to receive a portion of a bias to normally position said locking member in said first or locking position.

10. The vehicular storage device of claim 5 wherein said storage panel securing mechanism further includes a pusher member disposed adjacent said locking recess to selectively engage said storage panel when said storage panel securing mechanism is moved from said first position to said second position to move said storage position toward said second position.

11. A vehicular storage device for use in a van or the like comprising a storage panel including at least one substantially vertical storage panel member selectively movable between a first and second position rotatably mounted to the interior of the van by a storage panel support, a storage panel frame comprising an upper and lower substantially horizontal frame member held in spaced relationship relative to each other by at least two substantially vertical frame members and an offset mounting means including a first upper and lower concentrically aligned aperture is formed thereon to operatively receive said storage panel support and a storage panel securing mechanism movable between a first and second position such that when said storage panel securing mechanism is in said first position said storage panel securing mechanism secures said storage panel from movement when in said first position and when said storage panel securing mechanism is moved from said first to the second position said storage panel is released from said first position allowing pivoting of said storage panel to said second position whereby said storage panel is substantially disposed outside the van.

12. The vehicular storage device of claim 11 wherein said offset mounting means comprises an upper and lower offset mounting member affixed to said upper and lower substantially horizontal frame member respectively and said first upper and lower concentrically aligned apertures are formed through said upper and lower offset members respectively.

13. The vehicular storage device of claim 12 wherein said storage panel support comprises a first hollow substantially vertical column concentrically aligned with said first upper and lower concentrically aligned apertures to receive an upper and lower coupling member respectively in the upper and lower portions thereof mounted to the roof and floor of the van respectively.

14. The vehicular storage device of claim 13 wherein said upper coupling member comprises an upper substantially cylindrical member extending into said upper portion of said first hollow substantially vertical column and said lower coupling member comprises a lower substantially cylindrical member extending into said lower portion of said first hollow substantially vertical column.

15. The vehicular storage device of claim 11 wherein said storage panel securing mechanism comprises a locking member movable between a first or locking position and a second or unlocked position mounted on the floor of the van, said locking member comprises an inner locking element including a locking recess to selectively receive said substanstially vertical storage panel when said locking member and said substantially vertical storage panel are each in said first position.

16. The vehicular storage device of claim 15 wherein said locking member further includes an intermediate camming element having an inclined camming surface formed thereon and an outer actuator element.

17. The vehicular storage device of claim 15 wherein said storage panel securing mechanism further includes a securing mechanism bracket comprising a substantially vertical wall affixed to the floor of the van to support said locking member, a portion of said substantially vertical wall includes a slot to operatively receive a portion of said inner locking element and limit the rotational movement thereof.

18. The vehicular storage device of claim 17 wherein a portion of said substantially vertical wall forms a back stop to limit movement of said substantially vertical storage panel when in said first position.

19. The vehicular storage device of claim 15 further including a retainer member extending downwardly from said inner locking element to receive a portion of a bias to normally position said locking member in said first or locking position.

20. The vehicular storage device of claim 15 wherein said storage panel securing mechanism further includes a pusher member disposed adjacent said locking recess to selectively engage said storage panel when said storage panel securing mechanism is moved from said first position to said second position to move said storage position toward said second position.

21. The vehicular storage device of claim 11 wherein said storage panel comprises a pair of substantially vertical storage panel members held in spaced parallel relationship relative to each other by said storage panel frame.

* * * * *